ABSTRACT OF THE DISCLOSURE

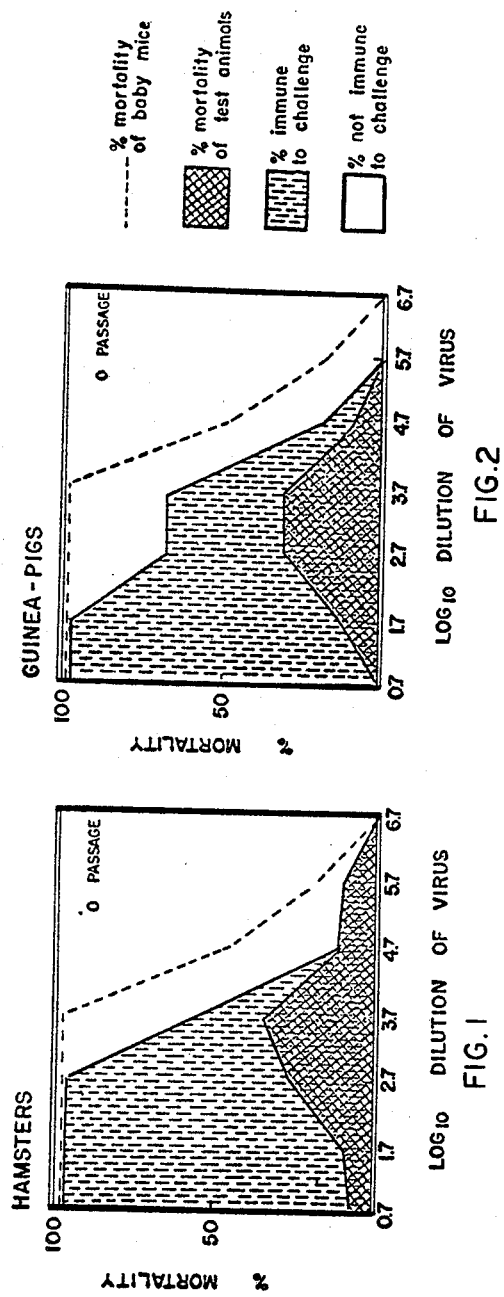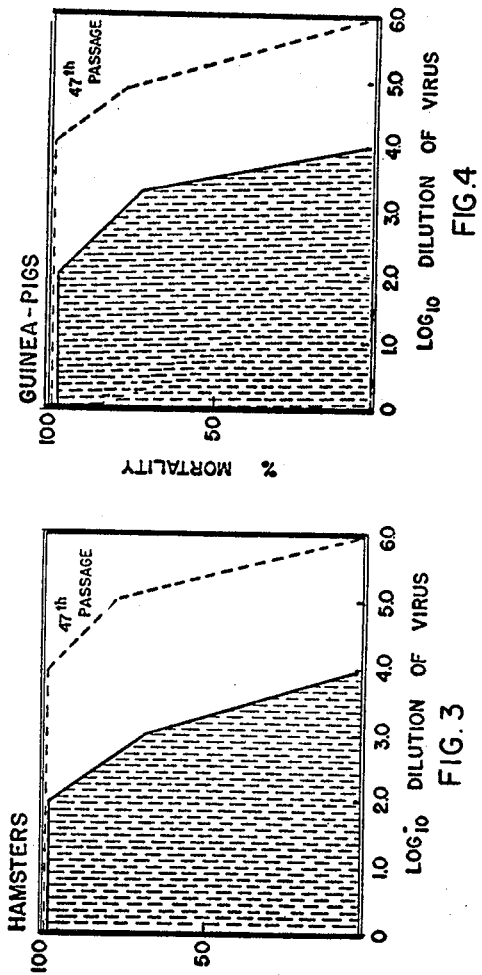
INVENTORS
MARIO V. FERNANDES
HILARY KOPROWSKI
TADEUSZ J. WIKTOR
BY Stowell & Stowell
ATTORNEYS 3,397,267
METHOD OF PRODUCING RABIES VACCINE
Mario V. Fernandes, Philadelphia, and Hilary Koprowski and Tadeusz J. Wiktor, Wynnewood, Pa., assignors to Research Corporation, New York, N.Y., a nonprofit corporation of New York
Filed Sept. 21, 1964, Ser. No. 397,763
8 Claims. (Cl. 424—89)

Anti-rabies vaccines are made by the subculture passage adaptation of live rabies virus strains for propagation in normal human diploid cells.

---

This invention relates to an anti-rabies vaccine and more particularly to a novel vaccine advantageously adapted to provide excellent levels of immunity to virulent rabies virus in humans and warm-blooded animals. The invention also relates to a method for preparing said anti-rabies vaccine.

Rabies is an extremely serious disease since, once it is contracted, no cure is available therefor and fatality rates are high. While the disease presently is not a major medical problem in the United States, indications are, however, that its incidence is on the increase. Moreover, contrary to the situation in the United States, in some countries abroad rabies is more prevalent and does constitute a significant threat to the welfare of humans, as well as domestic animals. Accordingly, a reliable, safe, and effective anti-rabies vaccine, if available, would be highly valuable.

Attempts have been made previously to develop a vaccine which is effective against rabies virus. The results of such efforts heretofore, however, have not been completely satisfactory in that the vaccines obtained either do not provide the requisite antigenic effects in terms of potency and/or duration and/or may even undesirably be characterized by an ability to produce unwanted side effects, sometimes permanent in nature, due to damage to vital cells such as brain cells.

Accordingly, it is the primary object of the present invention to provide an anti-rabies vaccine which is superior to similar vaccines heretofore available.

It is an additional object of the present invention to provide an anti-rabies vaccine which is characterized by the ability to provide effective levels of immunization to humans and other warm-blooded animals against infection by rabies virus.

Still another object of the present invention is to provide a method for preparing said highly advantageous anti-rabies vaccine.

Broadly described, the present invention provides an anti-rabies vaccine comprising a rabies virus strain selected from the group consisting of live rabies virus strains adapted for propagation growth in normal human diploid cells and inactivated species of said adapted live rabies virus strains.

The present invention further provides a method for producing an effective anti-rabies vaccine which comprises growing in a sterile culture of normal human diploid cells a strain of live rabies virus capable of infecting less than about 10% of said human diploid cells in said culture and maintaining at least a portion of the resultant grown virus through a series of subculture passages in separate non-infected sterile cultures of the normal human diploid cells by direct transfer of infected human diploid cells from a preceding passage in said series to provide a live rabies virus strain adapted to infect at least about 90% of the cells in a non-infected sterile culture of the normal human diploid cells.

In accordance with the present invention, the term "adapted," when employed to describe the growth characteristics of the live rabies virus strains of the invention in normal, i.e., non-infected, human diploid cells, is intended to refer to rabies virus strains produced by the above-described method which further are characterized by the ability to be propagated in fresh sterile cultures of the normal human diploid cells by a transfer of cell-free medium from a human diploid cell culture infected therewith. This characteristic of the live rabies virus strain employed in the vaccines of the invention advantageously distinguishes them from "non-adapted" rabies virus strains.

The human diploid cell tissue culture systems used in the present method are known and available. A specific example of such culture systems is the human diploid cell strain culture described in Exper. Cell Res., 25, page 595. Propagation of the tissue culture systems in vitro employed in the present method suitably may be carried out by any of the standard methods described in the prior art. Specific examples of such propagation techniques are disclosed in Exper. Cell Res., 25, page 595; Virology, 16, page 147; and J. Cell Biol., 17, page 299. The tissue culture systems, for example, usually comprise Eagle's basal medium in Earle's balanced salt solution supplemented with inactivated calf serum and containing a sterilizing amount of an antibiotic such as penicillin, streptomycin, aureomycin, or mixtures thereof, the system being buffered at a pH of about 6.8–8.5 with a conventional biological buffering agent, such as an alkali metal, e.g., sodium bicarbonate, carbonate, or hydrogen phosphate.

Live rabies virus strains heretofore available were "non-adapted" for growth in normal human diploid cells and constitute the starting virus employed in the present method. Such "non-adapted" rabies virus are readily available. Specific examples of such "non-adapted" strains of rabies virus include (a) a standard challenge rabies virus strain (CVS), a fixed rabies virus strain propagated in mouse brains and available at the National Institutes of Health, Bethesda, Maryland, (b) the Pittman-Moore rabies virus strain (PM), a fixed rabies virus strain propagated in rabbit brains and available at the National Institutes of Health, and (c) Flury high egg passage virus strain (HEP), a chicken embryo adapted rabies virus strain at the 225th egg passage, described in Bull. WHO, 10, page 799. The HEP rabies virus strain constitutes the preferred starting strain employed in preparing the vaccines of the present invention.

In accordance with the present method, a sample of "non-adapted" live virulent rabies virus strain, usually in the form of an aqueous virus pool consisting of from about a 10% to 25% suspension of infected tissue, e.g., HEP in chicken embryo, in about 40% to 60% normal calf serum in distilled water, is mixed with the human diploid cell tissue culture medium, and the resultant rabies virus-containing culture medium is incubated to allow the virus to infect the cells. The mixing ratio of rabies virus to human diploid cells in the tissue culture medium preferably is in the range of from about $1 \times 10^5$ to about $1 \times 10^8$ $LD_{50}$ of virus per $1 \times 10^5$ cells of the human diploid cell tissue. The incubation for the initial steps as well as the succeeding subcultivation passage steps, hereinafter described, preferably is carrier out at a temperature in the range of from about 30 to about 40° C.

The incubation of the treated tissue culture medium preferably is allowed to stand until the tissue cell culture becomes confluent, usually in about 3 to 4 days, and no appreciable further infection of the cells is observed.

At the end of the initial step of the process at least a portion of the resultant rabies virus grown in the infected tissue culture system is transferred to a fresh human diploid cell culture system. The transfer suitably is carried out by a transfer of virus-infected cells from the initial culture system with the mixing of same with fresh sterile human diploid cells while maintaining the virus alive. In the transfer step, in instances wherein an agent is employed to detach the infected cells to be transferred from the remainder of the culture and a support on which the cultivation is carried out, the transfer aid preferably is a proteolytic enzyme such as trypsin. The mixture of the virus-infected cells obtained from the first stage and the fresh human diploid cell culture medium then is incubated, as described in relation to the first stage, to allow the rabies virus to infect and grow in the resultant culture.

In accordance with the invention, the aforedescribed transfer of the virus-infected human diploid cells to a succeeding subcultivation stage, mixing of transferred infected cells with fresh human diploid cells in a tissue culture medium thereof and incubation of the resultant mixture of infected and fresh cells to infect and grow the transferred rabies virus strain in the fresh tissue culture are carried out over a requisite number of stages of subcultivations to provide a rabies virus strain adapted for growth propagation in human diploid cells. Rabies virus strains so poduced and which are so "adapted" have the characteristic of the strain being able to be propagated through succeeding serial stages by transfer merely of cell-free medium containing the virus strain from an infected culture to a fresh human diploid cell culture wherein at least about 90% of the cells are infected thereby.

The actual number of culture passages required in adapting rabies virus to growth in human diploid cells depends principally upon the particular starting rabies virus strain. The number of serial culture passages generally utilized is at least about 10. In preferred embodiments of the invention employing human diploid cell culture systems and starting with non-adapted HEP or CVS rabies virus strains, the requisite number of serial culture passages to provide an adapted virus strain is in the range of from about 45 to about 50.

The adapted rabies virus strain may be employed as live vaccine, or it may be killed by any standard virus inactivation procedure using phenol, beta-propiolactone and the like inactivating agents and employed as a vaccine in inactivated form.

The invention having been described above in detail, the following examples are given to show further specific embodiments thereof. It will be understood the examples are given merely for illustration purposes and not by way of limitation.

The basic materials employed in the work represented by the data appearing in the examples are the following:

Virus strains (1) Standard challenge virus strain (CVS), a fixed rabies virus propagated in mouse brain, available at the National Institutes of Health, Bethesda, Maryland.

(2) Pittman-Moore virus strain (PM), a fixed rabies virus propagated in rabbit brain, available at the National Institutes of Health.

(3) Flury high egg passage virus strain (HEP), a chicken embryo adapted rabies virus at the 225th egg passage, described in Bull. WHO, 10, page 799.

Pools of the above rabies virus strains consisting of a 20% suspension of the infected tissue in 50% normal calf serum in distilled $H_2O$ were kept at —70° C.

(4) An attenuated poliovirus type 1 strain (CHAT) grown in a human diploid cell strain.

(5) Eastern equine encephalomyelitis virus (EEE) grown in primary chicken fibroblasts.

The tissue culture system used was human diploid cell strain (HDCS), derived from embryonic lung as described in Exper. Cell Res., 25, page 595.

The tissue culture system was propagated in vitro by the method described in Exper. Cell Res., 25, 595. Eagle's basal medium in Earle's balanced salt solution supplemented with 10% inactivated calf serum and containing 25 ml. of 5.6% sodium bicarbonate, $10^5$ units of penicillin and $10^5$ $\mu$g. of streptomycin or $5 \times 10^4$ $\mu$g. of aureomycin per liter was used throughout. Cultures of HDCS were transferred twice weekly, using a 0.25% solution of tryspin in phosphate buffered saline supplemented with the antibiotics described above.

Example I

About $1 \times 10^6$ $LD_{50}$ of HEP virus were mixed with about $10^6$ of dispersed HDCS cells in suspension. The resultant mixture was plated into culture bottles and incubated at about 37° C. for about 3 days. At the end of the incubation period the infectivity of the culture was determined by the immunofluorescent antibody staining and titrating technique described in J. Exper. Med., 91, page 1, as modified in Bull. WHO, 20, page 579, using antirabliesglobulin conjugate available at the National Rabies Laboratory, Atlanta, Georgia. The virus-infected culture preparation was also examined for cytopathic effects and coverslip preparations were also stained with May-Greenwald-Giemsa, after fixation for 20 minutes in Bouin's fixative, in order to determine the presence of inclusion bodies and confirm the destructive effect of the virus on the cell. The presence of HEP virus was determined by intracerebral inoculation (.03 ml.) of 4-day-old Swiss stock mice. For titration purposes, tenfold dilutions of the virus were inoculated into 5 to 10 animals per dilution. The mice were observed for 21 days and the endpoint was calculated according to the method described in Amer. J. Hyg., 27, 493. Medium from primary infected cultures was used to infect suspensions of the new cells. Infected cells were detached from glass by action of trypsin, resuspended in fresh medium, divided into two fractions and transferred to tissue culture vessels of twice the original surface. The fluorescing (staining) cell, destruction and virus presence tests were repeated on the resultant infected cultures after the described incubation period. Transfer of the cell-free medium was repeated as indicated in Table 1. The division and transfer of virus containing infected cells could be carried for 20 passages before there was total cell lysis. It was then necessary, in order to maintain serial virus passage, to mix infected cells with a suspension of new non-infected homologous cells as indicated in Table 1. The characteristics of the virus strains produced were determined as described above. The results of the tests are set forth below in Table 1.

TABLE 1.—ADAPTATION OF HEP RABIES VIRUS TO GROWTH IN HDCS

| Passage Number | Procedures for Virus Transfers | | | | | | | | |
|---|---|---|---|---|---|---|---|---|---|
| | Subculture | | | Cell-mixing | | | Cell-free medium | | |
| | IF | CPE | BMI | IF | CPE | BMI | IF | CPE | BMI |
| 1 | + | − | 1.5 | | | | + | − | 1.5 |
| 3 | + | − | | | | | + | − | |
| 5 | ++ | − | 3.6 | | | | + | − | |
| 7 | +++ | + | | | | | − | Non-infectious | − |
| 9 | ++++ | + | 4.5 | | | | | | |
| 11 | ++++ | + | | ++++ | + | | | | |
| 13 | ++++ | ++ | | ++++ | + | 4.5 | | | |
| 15 | ++++ | +++ | 4.6 | | | | | | |
| 17 | ++++ | ++++ | | ++++ | + | | + | − | |
| 19 | | Complete lysis | | ++++ | + | 4.0 | + | − | − |
| 21 | | | | ++++ | + | | − | Non-infectious | |
| 23 | | | | ++++ | ++ | | | | |
| 25 | | | | ++++ | ++ | | | | |
| 45 | | | | ++++ | +++ | | | | |
| 47 | | | | ++++ | ++++ | 5.5 | | | |
| 49 | ++++ | ++++ | | ++++ | ++++ | | ++++ | ++++ | |
| | | Complete lysis | | | | | | | |
| 59 | ++++ | ++++ | | ++++ | ++++ | | ++++ | ++++ | |
| 61 | | Complete lysis | | | | Current passage | | | |

Code.—Percent of cells destroyed (CPE) or Fluorescing (IF). BMI—Baby mouse $LD_{50}/0.03$ ml. of medium ($\log_{10}$). ++++ = 90–100. +++ = 50–90. ++ = 10–50. + = 1–10. − = 0.

As shown in Table 1, HEP rabies virus could infect HDCS cells either as monolayers or dispersed cell cultures, but serial transfer of either the medium or the cell extracts in a homologous tissue culture system resulted in a gradual decrease of infectivity which was finally lost after 7 passages. The results obtained in such transfer methods through the immunofluorescent staining of the infected tisue culture systems indicated that very few cells produced rabies virus antigen at any given time after infection with medium from the preceding culture. The small amounts of infective virus apparently made it impossible to propagate the virus either by transferring the medium or the cell-free extract from infected cultures.

Following lysis of the infected cultures at the 20th passage level, attempts were again made as shown in Table 1 to propagate the virus by transfer of cell-free media. Table 1 shows, however, that these attempts were unsuccessful and portions of the infected culture had to be mixed with non-infected homologous cells at each transfer passage in order to maintain the virus in the tissu culture system. Using this technique, fluorescence of al cells was observed on the third day after cell transfer an HEP strains of rabies virus could be maintained for a unlimited number of passages. Table 1 also shows tha after maintaining the HEP strain for 47 tissue cultur passages using the "cell-mixing" transfer technique, th attempt to propagate the virus by transfer of cell-free tis sue culture medium was successful and it was possible t maintain virus in serial passages.

Example II

The basic procedure of Example I was repeated with th exceptions of substituting CVS rabies virus strain for th HEP rabies virus strain and employing 4 to 5-week-ol Swiss mice of the same stock in the virus presence tests The transfer techniques and results thereof are set fortl in Table 2.

TABLE 2.—ADAPTATION OF CVS RABIES VIRUS TO GROWTH IN HDCS

| Passage Number | Procedures for Virus Transfers | | | | | | | | |
|---|---|---|---|---|---|---|---|---|---|
| | Subculture | | | Cell-mixing | | | Cell-free medium | | |
| | IF | CPE | AMI | IF | CPE | AMI | IF | CPE | AMI |
| 1 | + | − | 3.3 | | | | + | − | 3.7 |
| 3 | + | − | | | | | + | − | 1.4 |
| 5 | ++ | − | 3.0 | | | | − | − | − |
| 7 | +++ | − | 3.4 | ++++ | + | | | Non-infectious | |
| 9 | ++++ | + | 4.0 | ++++ | + | 4.5 | | | |
| 11 | ++++ | + | | | | | | | |
| 13 | ++++ | + | 4.1 | | | | | | |
| 15 | ++++ | ++ | 4.0 | | | | | | |
| 17 | ++++ | +++ | | ++++ | + | | ++++ | + | |
| 19 | ++++ | ++++ | | ++++ | + | | ++ | + | |
| 21 | | Complete lysis | | ++++ | + | | + | − | |
| 23 | | | | ++++ | + | 3.5 | + | − | |
| 25 | | | | ++++ | + | 4.4 | − | Non-infectious | − |
| 45 | | | | ++++ | ++ | | | | |
| 47 | | | | ++++ | ++ | 4.3 | | | |
| 49 | ++++ | ++ | | ++++ | ++ | | ++++ | ++ | |
| 59 | ++++ | +++ | | ++++ | ++ | | ++++ | ++ | |
| 61 | | | | | | Current passages | | | |

Code.—Percent of cells destroyed (CPE) or Fluorescing (IF). AMI—Adult mice $LD_{50}/0.03$ ml. of mediu ($\log_{10}$). ++++ = 90–100. +++ = 50–90. ++ = 10–50. + = 1–10. − = 0.

Table 2 reveals also that CVS rabies virus may be adapted to HDCS by means of the "cell-mixing" technique of Example I after 47 tissue culture passages and the resultant adapted CVS strain may be propagated thereafter by transfer of cell-free tissue culture medium.

Example III

In order to verify the identity of adapted rabies virus after its serial passages in HDCS cells, serial tenfold dilutions of HEP before and after adaptation to HDCS as per Example I were mixed with normal and anti-rabies sera, respectively, incubated for 1 hour at 37° C. and then injected intracerebrally into baby mice. The test was performed in young mice injected intracerebrally according to the standard method described in Laboratory Techniques in Rabies, Monograph Series, No. 23, WHO, 1954. Anti-rabies sera were obtained from three sources: (a) dried anti-rabies gamma globulin prepared in horses at the Metchnikoff Research Institute, Moscow; (b) anti-rabies serum prepared in horses at the Pasteur Institute, Paris; and (c) human anti-rabies serum from a man who had been immunized by the classical Pasteur treatment and had, in addition, received 3 booster inoculations of Flury HEP virus. The results, presented in Table 3 below, indicate clearly that the HDCS-adapted virus was neutralized by anti-rabies serum. Similar results were obtained when CVS and PM virus strains were tested.

TABLE 3.—SERONEUTRALIZATION OF HEP STRAIN OF VIRUS BEFORE AND AFTER ADAPTATION TO HDCS IN BABY MICE

| Serum Used for Neutralization | Morality Ratio of Mice Inoculated with Mixtures of Serum and Dilutions of Virus* (Dilutions) | | | | | | |
|---|---|---|---|---|---|---|---|
| | Δ | $10^1$ | $10^2$ | $10^3$ | $10^4$ | $10^5$ | $10^6$ |
| Passage Level: | | | | | | | |
| 0 — Normal | 7/7 | 9/9 | 9/9 | 7/7 | 3/7 | 0/6 | |
| 0 — Anti-Rabies | 0/7 | 0/7 | 0/8 | 0/6 | | | |
| 49 — Normal | 8/8 | 8/8 | 8/8 | 8/8 | 8/8 | 4/8 | 0/8 |
| 49 — Anti-Rabies | 6/8 | 0/8 | 0/8 | 0/8 | 0/8 | 0/8 | |

*Nominator=No. of mice who died after inoculation. Denominator=No. of mice inoculated. Δ Undiluted.

Example IV

In order to determine whether the properties of rabies virus strains are modified upon continuous passage in HDCS cells according to the present invention, the cytopathic effects and immunofluorescence produced by the HEP rabies virus strain and the presence of the virus subcultivated in HDCS in accordance with the procedure of Example I were determined as described in Example I at culture passage levels of 0, 13 and 47 and $10^{-1}$, $10^{-2}$, $10^{-3}$, $10^{-4}$, $10^{-5}$, and $10^{-6}$ dilutions of the virus. The results are set forth in Table 4 below.

The data in Table 4 indicate that there was no direct correlation between infectivity of the virus for baby mice and the development of cytopathic effect and suggest that in the course of continuous propagation in the human diploid cell strain (HDCS), HEP virus particles were selected which had greater affinity for the tissue culture system in which they were propagated.

Example V

To further determine the modification of the properties of rabies virus adapted in accordance with the present invention, the pathogenicity of HEP rabies virus before adaptation to HDCS and after adaptation thereto as per Example I was compared on monkeys. In the tests 2 Rhesus monkeys weighing about 6 to 8 pounds were injected with about 0.25 ml. of 2 dilutions of egg-adapted HEP virus before its adaptation to HDCS, became sick (on the 12th day after inoculation) and were sacrificed when moribund 2 days later. At the same time 2 other monkeys of the same type injected intracerebrally with higher concentrations of HEP virus obtained at the 47th passage level in HDCS in accordance with Example I showed no signs of illness during a 6-month observation period. Groups of 8 and 2 monkeys of the same type also were injected intracerebrally with $10^{6.5}$ and $10^{5.5}$ baby mouse $LD_{50}$ (0.25 ml.) of the HEP virus at the 47th passage in HDCS. None of the animals showed signs of sickness during a 60-day observation period. The results of the tests are set forth in Table 5.

TABLE 5.—RESULTS OF INTRACEREBRAL INOCULATION OF MONKEYS WITH HEP VIRUS BEFORE AND AFTER ADAPTATION TO HDCS

| Experiment No. | | Infectivity Ratio of Monkeys Injected Intracerebrally with Baby Mouse $LD_{50}$* ($\log_{10}$) | | | |
|---|---|---|---|---|---|
| | | 6.5 | 5.5 | 4.5 | 3.5 |
| Passage Level: | | | | | |
| 0 | 1 | | | 1/1 | 1/1 |
| 47 | 1 | 0/1 | 0/1 | | |
| | 2 | 0/8 | 0/2 | | |

*Nominator=No. of monkeys who died after inoculation. Denominator=No. of inoculated monkeys with no signs of illness.

Table 5 shows that adaptation to HDCS not only did not increase pathogenicity of the HEP virus for primates, but that the adapted virus apparently lost its lethal properties for monkeys when injected directly into the central nervous system.

Example VI

In order to investigate the behavior of rabies virus after passage through baby mouse brain, baby mice were injected intracerebrally with serial tenfold dilutions of the HEP virus before and after adaptation to HDCS in accordance with Example I and sacrificed as soon as they showed signs of illness. Serial tenfold dilutions of a suspension made from the brain tissue of these animals were TABLE 4.—CYTOPATHIC EFFECT AND IMMUNOFLUORESCENCE OF HEP STRAIN OF RABIES VIRUS—AT DIFFERENT PASSAGE LEVELS IN HDCS

| Passage Level | Test | Dilution of Virus | | | | | | $LD_{50}$/ml. in Baby Mice ($\log_{10}$) |
|---|---|---|---|---|---|---|---|---|
| | | $10^{-1}$ | $10^{-2}$ | $10^{-3}$ | $10^{-4}$ | $10^{-5}$ | $10^{-6}$ | |
| | CPE | − | − | − | − | − | − | 6.00 |
| | IF | + | − | − | − | − | − | |
| | CPE | + | + | − | − | − | − | 6.00 |
| | IF | ++++ | +++ | + | − | − | − | |
| | CPE | ++++ | ++++ | ++++ | +++ | ++ | + | 7.00 |
| | IF | ++++ | ++++ | ++++ | +++ | ++ | + | |

Code percent of cells destroyed (CPE) or Fluorescing (IF) as recorded on the 12th day after infection. ++++=90–100. +++=50–90. ++=10–50. +=1–10. −=0.

then injected intracerebrally into young adult mice. The results of the tests are set forth in Table 6.

TABLE 6.—RESULTS OF INOCULATION OF ADULT MICE WITH BRAIN TISSUE OBTAINED FROM BABY MICE INJECTED WITH EGG-ADAPTED AND HDCS ADAPTED HEP VIRUS, RESPECTIVELY

| Virus Dilutions | Dilutions of Baby Mouse Brain Inocula | Mortality Ratio of Adult Mice Inoculated with Baby Mouse Brain Infected with HEP* | | | |
|---|---|---|---|---|---|
| | | Egg-Adapted | | HDCS-Adapted | |
| | | NS[A] | RS[AA] | NS | RS |
| $10^{-1}$ | $10^{-1}$ | 0/6 | | 0/5 | |
| | $10^{-2}$ | 0/6 | | 4/5 | 0/5 |
| | $10^{-3}$ | 0/6 | | 0/5 | |
| $10^{-2}$ | $10^{-1}$ | 2/6 | 0/6 | 0/5 | |
| | $10^{-2}$ | 3/6 | 0/6 | 0/5 | |
| | $10^{-3}$ | 1/6 | 0/6 | 0/5 | |
| $10^{-3}$ | $10^{-1}$ | 6/6 | 1/6 | 0/5 | |
| | $10^{-2}$ | 6/6 | 0/6 | 0/5 | |
| | $10^{-3}$ | 5/6 | 0/6 | 0/5 | |
| $10^{-4}$ | $10^{-1}$ | 1/6 | 0/6 | 0/5 | |
| | $10^{-2}$ | 3/6 | 0/6 | 0/5 | |
| | $10^{-3}$ | 1/6 | 0/6 | 0/5 | |
| $10^{-5}$ | $10^{-1}$ | | | 0/5 | |
| | $10^{-2}$ | | | 0/5 | |
| | $10^{-3}$ | | | 0/4 | |

*Nominator=No. of mice who died after inoculation of baby mice brain tissue infected with HEP. Denominator=No. of adult mice inoculated. [A] NS=Normal Serum. [AA] RS=Serum with Rabies Antibodies.

As can be seen from Table 6, only in one instance did passage of HDCS-adapted HEP produce a rabies virus population which seemed to become pathogenic for adult mice; whereas, rabies virus pathogenic for adult mice has been recovered from the brain tissue of baby mice injected with all dilutions (except $10^{-1}$) of egg-adapted HEP.

Example VII

Pathogenicity of HDCS-adapted HEP provided as per Example I for young adult Syrian hamsters and guinea pigs (weighing about 350 gm. each) inoculated intracerebrally was investigated in experiments in which they were inoculated with 0.1 ml. of serial tenfold dilutions of egg-adapted and HDCS-adapted HEP. The animals were observed for 21 days. The results of the tests are shown in the figure.

The figure shows that a fraction of the virus population of the egg-adapted HEP is pathogenic for hamsters and guinea pigs. In contrast, not a single animal injected with HDCS-adapted HEP showed signs of sickness.

Example VIII

The resistance of rabies-infected HDCS cultures to re-infection with homologous and heterologous viruses was investigated. Because HEP virus is not pathogenic for adult mice injected intracerebrally it was possible to study interference in HDCS infected with this strain of rabies virus and re-exposed to another rabies strain, such as PM, which retained its pathogenicity for adult mice.

Cultures of HDCS infected with the HEP strain of virus at the 14th passage level as per Example I and showing 100% fluorescing cells were trypsinized, counted and exposed, in suspension, to the PM strain of virus. The procedure was repeated for non-infected HDCS. After adsorption for 2 hours at 37° C. with constant agitation, the cells were centrifuged, washed 3 times with new medium and planted in Petri dishes containing coverslips. After 5 and 10 days of incubation, respectively, the coverslips were stained to determine immunofluorescence and the supernatant medium was titrated in adult mice about 4 to 5 weeks old by intracerebral inoculation to determine the presence of PM virus.

The end point of the titration was determined as described above with respect to HEP titrations. The result of the tests are set forth in Table 7.

TABLE 7.—RESISTANCE OF HEP-INFECTED HDCS TO RE-INFECTION WITH PM STRAIN OF RABIES

| HDCS Cultures Infected With— | Percent Cells Showing IFAS (Days after exposure to PM virus) | | $LD_{50}$ Titer o. Medium in Adult Mice |
|---|---|---|---|
| | 5 | 10 | |
| HEP[A] | * | * | 0 |
| None | 1 | 20 | $10^{3.6}$ |

* All cells fluorescing because of infection with HEP.
[A] At 14th passage level in HDCS.

The results shown in Table 7 indicate that the PM challenge virus apparently could not multiply in the HEP infected cells, although it did infect and multiply in HDCS controls.

To determine the resistance of HDCS-infected culture to challenge with heterologous virus, one day after monolayers had formed in the cultures, several HEP, CVS and PM rabies-infected HDCS cultures prepared as per Examples I and II and containing 100% fluorescing cell; and control HDCS cultures were exposed to challenge with serial tenfold dilutions of either the polio or EEF virus described above containing a maximum of $5 \times 10$ plaque forming units and $5 \times 10^3$ plaque forming units respectively. After one hour of adsorption the inoculum of the cultures was removed and, when the cultures had been washed 3 times with phosphate buffered saline, agal overlay was added. The cultures were incubated for ? days at 37° C. and then stained with neutral red solutior at a 1:10,000 concentration in order to determine the number of plaques of either polio or EEE virus. Three Petri dishes were used for each dilution of challenge virus. The results of the tests are set forth in Table 8.

TABLE 8.—RESISTANCE OF RABIES-INFECTED HDCS TO CHALLENGE WITH POLIOVIRUS AND EASTERN EQUINE ENCEPHALOMYELITIS (EEE)

| Challenge Virus | HDCS Infected with Rabies Virus Strains* | Average of Plaques Observed After Infection with Challenge Virus Dilutions | | | | |
|---|---|---|---|---|---|---|
| | | $10^{-3}$ | $10^{-4}$ | $10^{-5}$ | $10^{-6}$ | $10^{-7}$ |
| | | R N | R N | R N | R N | R N |
| Polio | CVS | 0} 0}C | 0} 0}C | 0} 0}C | 0} 0}53 | 0}3 |
| | PM | | | | | |
| | HEP | | | | | |
| EEE | CVS | 0}C | 0}C | 0}52 | 0}4 | |
| | HEP | 0} | 0} | 0} | 0} | |

*Passage level in HDCS: CVS at 49th; PM at 10th; HEP at 14th.
R=Rabies-infected. N=Non-infected controls. C=Complete cell lysis.

The results of challenge shown in Table 8 show complete resistance of rabies-infected HDCS cultures to infection with the poliovirus and EEE virus.

Example IX

To determine the immunizing properties of HEP virus after adaptation to HDCS, adult mice were injected intraperitoneally twice at 7-day intervals with 0.5 ml. of tissue culture fluids, representing the 13th and 47th passages of HEP in HDCS as per Example I, respectively. Twenty-one days after the first injection, CVS strain was titrated intracerebrally in the 2 groups of immunized animals and in non-vaccinated controls of the same stock. The results of the tests are shown in Table 9.

TABLE 9.—RESULTS OF PROTECTION TEST* IN ADULT MICE USING LIVE RABIES VACCINE PREPARED FROM HDCS-ADAPTED HEP

| Vaccine | | Titration of Challenge Virus (CVS) | | |
|---|---|---|---|---|
| Passage level | Baby mouse $LD_{50}$ in inoculated ($log_{10}$) | $LD_{50}$ in vaccinated mice ($log_{10}$) | $LD_{50}$ in control mice ($log_{10}$) | Protection index |
| 13 | 6.00 | 4.15 | 6.50 | 224 |
| 47 | 7.00 | 1.63 | 6.50 | 74,000 |

*Two intraperitoneal injections of vaccine given at 7-day intervals. Intracerebral challenge 21 days after the first injection.

The results of the challenge inoculation set forth in Table 9 indicate that both preparations of the HEP virus immunized mice against challenge with the greater degree of resistance being shown by mice injected with the virus at the 47th passage level.

Example X

The immunizing characteristics of the HDCS-adapted rabies virus of the invention were further demonstrated by immediately challenging the hamsters and guinea pigs, which were living following their treatment described in Example VII, with a lethal dose of CVS virus as per the procedure of Example IX. The results of these tests shown in the figure indicate that the HEP-inoculated animals became resistant to CVS virus.

Example XI

Three Rhesus monkeys weighing 6 to 8 pounds were injected intramuscularly twice at 4-day intervals with undiluted tissue culture fluids, representing the 47th passage of HEP virus in HDCS as per Example I and containing $1 \times 10^7$ baby mouse $LD_{50}$. For comparison, another group of 3 Rhesus monkeys of the same stock was injected similarly with a chick embryo preparation of HEP virus prior to its adaptation to HDCS. Sera were obtained from the inoculated animals 14 days after the first virus inoculation and were submitted to the neutralization test described in Example III. The results of the tests are listed in Table 10.

TABLE 10.—DEVELOPMENT OF NEUTRALIZING ANTIBODIES IN MONKEYS IMMUNIZED WITH LIVE HEP-STRAIN OF RABIES AT DIFFERENT PASSAGE LEVELS IN HDCS

| | Vaccine | | Antibody titer in monkey sera obtained** | |
|---|---|---|---|---|
| Number of animals tested | Virus passage level in HDCS | Baby mouse $LD_{50}$ used for immunization* | Before immunization | 14 days after first inoculation of vaccine |
| ---------- | 0 | $4 \times 10^6$ | <1:2<br><1:2<br><1:2<br><1:2<br><1:2<br><1:2 | <1:2<br><1:2<br><1:2<br>>1:250<br>>1:250<br>>1:250 |
| ---------- | 47 | $4 \times 10^7$ | | |

*Vaccine inoculated on 1st and 5th day.
**CVS Virus =1,000 $LD_{50}$ for mouse inoculum.

Results of the test indicate the presence of a large concentration of neutralizing antibodies in sera obtained from the 3 monkeys vaccinated with the HDCS-adapted virus and apparent absence of detectable antibodies in sera of the animals injected with the egg-adapted virus.

Example XII

To determine the immunizing properties of inactivated rabies vaccines prepared with rabies virus strains adapted to grow in HDCS in accordance with the invention, 4 preparations (following the procedure of Example II) of the CVS strain at different passage levels in HDCS and 1 preparation of the PM strain at the 12th passage in HDCS were inactivated. Infected tissue culture preparations were inactivated either by the addition of phenol at a final concentration of 0.5% and incubation at 37° C. for 48 hours or by treatment with beta propiolactone at a final concentration of 1/6000 and incubation at 4° C. for 24 hours. Twenty 5-week-old mice were inoculated intracerebrally with undiluted vaccine and tested for the absence of infective virus. Intracerebral inoculation of twenty 5-week-old mice with undiluted inactivated vaccines failed to reveal the presence of infectious virus. Tests for the presence of infectious virus were carried out as per Example II. The 5 lots of vaccine were then submitted to a standard Habel test, described in Laboratory Techniques in Rabies, Monograph Series, No. 23, WHO, 1954. The results of the test are set forth in Table 11.

TABLE 11.—EFFECT OF TWO INACTIVATING AGENTS ON POTENCY OF RABIES VIRUS PREPARED FROM CVS AND PM STRAINS GROWN IN HDCS (HABEL TEST)

| | Vaccine | | | Titration of Challenge Virus (CVS) | | |
|---|---|---|---|---|---|---|
| Virus strain | Passage level in HDCS | $LD_{50}$ titer in mice before inactivation ($\log_{10}$) | Inactivating agent | $LD_{50}$ in vaccinated mice($\log_{10}$) | $LD_{50}$ in control mice ($\log_{10}$) | Protection index |
| CVS | 13 | 4.12 | Phenol | 4.90 | 6.26 | 23 |
| CVS | 15 | 3.00 | ---do--- | 4.98 | 6.26 | 18 |
| CVS | 9 | .50 | BPL | 1.11 | 5.63 | 30,380 |
| CVS | 47 | 4.30 | BPL | 0.74 | 5.63 | 70,750 |
| PM | 12 | 3.80 | BPL | 1.57 | 5.63 | 11,500 |

BPL=Beta propiolactone.

Table 11 shows that, whereas the potency of the 2 CVS preparations inactivated with phenol was very low, the immunizing capacity of the 3 vaccines prepared from CVS and PM strains and inactivated by BPL was extremely high.

The work on which this application was based was financed in whole or part by the Public Health Service.

We claim:

1. A method for producing an effective anti-rabies vaccine which comprises growing in a sterile culture of normal human diploid cells a strain of live rabies virus capable of infecting less than about 10% of said human diploid cells in said culture and maintaining at least a portion of the resultant grown virus through a series of subculture passages in separate non-infected sterile cultures of the normal human diploid cells by direct transfer at each transfer stage of infected human diploid cells from a preceding passage in said series to the next succeeding non-infected culture of diploid cells to provide a live rabies virus strain adapted to infect at least about 90% of the cells in a non-infected sterile culture of the normal human diploid cells.

2. The method according to claim 1 wherein the number of transfer stages in said series of subculture passages is at least about 10.

3. The method according to claim 1 wherein the number of transfer stages is in the range of from about 45 to about 50.

4. The method according to claim 1 wherein said adapted live rabies virus strain produced in said series of subculture passages is propagated by transferring cell-free medium from the last infected human diploid cell culture dispersion in said series to a non-infected sterile culture of said human diploid cells.

5. The method according to claim 1 wherein said adapted live rabies virus strain produced in said series of subculture passages subsequently is inactivated.

6. The method according to claim 5 wherein said inactivation is carried out by a treatment of said adapted live rabies virus with beta-propiolactone.

7. As an anti-rabies vaccine, tissue culture fluid containing the adapted virus prepared according to the method of claim 1.

8. As an anti-rabies vaccine, tissue culture fluid containing the adapted virus prepared according to the method of claim 5.

References Cited

Hayflick et al.: Experimental Cell Research, vol. 25, pp. 604–606 and 616–619, 1961.

Koprowski et al.: J. Immunology, vol. 60, No. 4, pp. 533, 537 and 550–553, 1948.

Peck et al.: J. American Medical Association, vol. 162 No. 15, Dec. 8, 1956, pp. 1373–1376.

RICHARD L. HUFF, *Primary Examiner.*

LEWIS GOTTS, *Assistant Examiner.*